April 24, 1956   B. KELLEY   2,743,071
HELICOPTER AUTOMATIC FLIGHT CONTROL
Filed Dec. 2, 1952   2 Sheets-Sheet 1

INVENTOR.
BARTRAM KELLEY
BY
Beau, Brooks, Buckley & Beau.
ATTORNEYS.

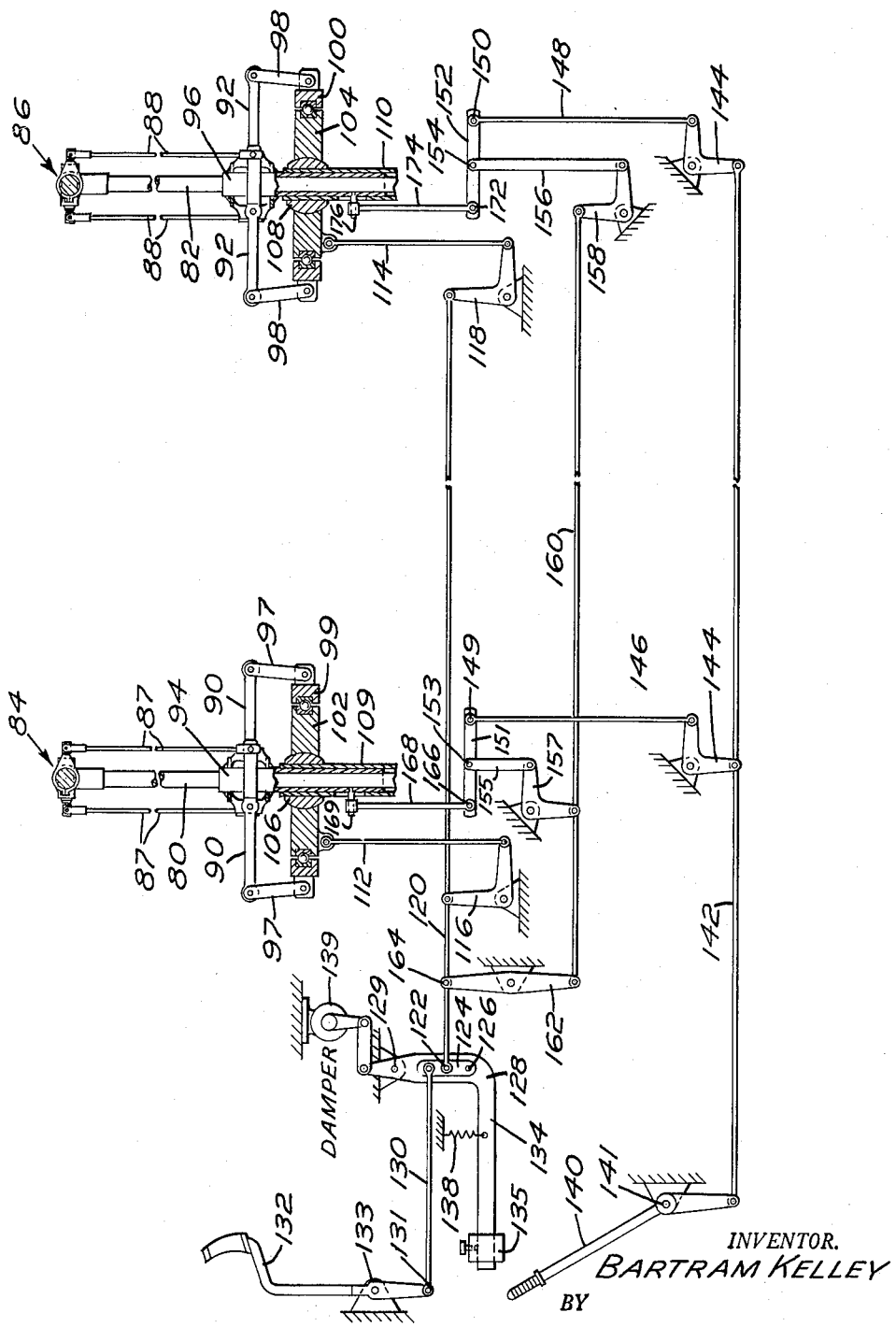

2,743,071
Patented Apr. 24, 1956

United States Patent Office

2,743,071
HELICOPTER AUTOMATIC FLIGHT CONTROL

Bartram Kelley, Dallas, Tex., assignor to Bell Aircraft Corporation, Wheatfield, N. Y.

Application December 2, 1952, Serial No. 323,644

10 Claims. (Cl. 244—17.13)

This invention relates to rotary wing aircraft, and more particularly to means for converting a helicopter aircraft which is inherently non-stable in flight into a stable type.

Experience has shown that most helicopter aircraft, when in forward flight with the pilot stick either locked or held inattentively by the pilot, tend to oscillate phugoidally in a manner commonly referred to as "porpoising." If such oscillations are not countered by skillful application of controls by the pilot, they increase automatically in amplitude and violence, divergently from the intended flight path, and soon result in a dangerously unstable flight condition. It is the primary object of the present invention to provide in a helicopter aircraft or the like, means operating automatically to damp the aforementioned oscillations so as to cause the aircraft to tend to return to a straight line flight path subsequent to any disturbance therefrom without attention by the pilot, thereby giving the aircraft inherently stable flight characteristics. Other objects and advantages of the invention will appear from the specification hereinafter.

In the drawing:

Fig. 4 is a fragmentary schematic elevational view of a rotor control arrangement of the present invention as applied to a tandem rotor type helicopter aircraft.

The invention contemplates, broadly, provision of a vertical acceleration-responsive inertia device in the aircraft connected into the rotor blade cyclic pitch control system in such manner as to react to vertical accelerations thereon by introducing pitch corrective control motions into the rotor blade cyclic pitch control system prior to full development of the phugoid oscillation producing effects which are set up by the disturbance.

Figure 1:
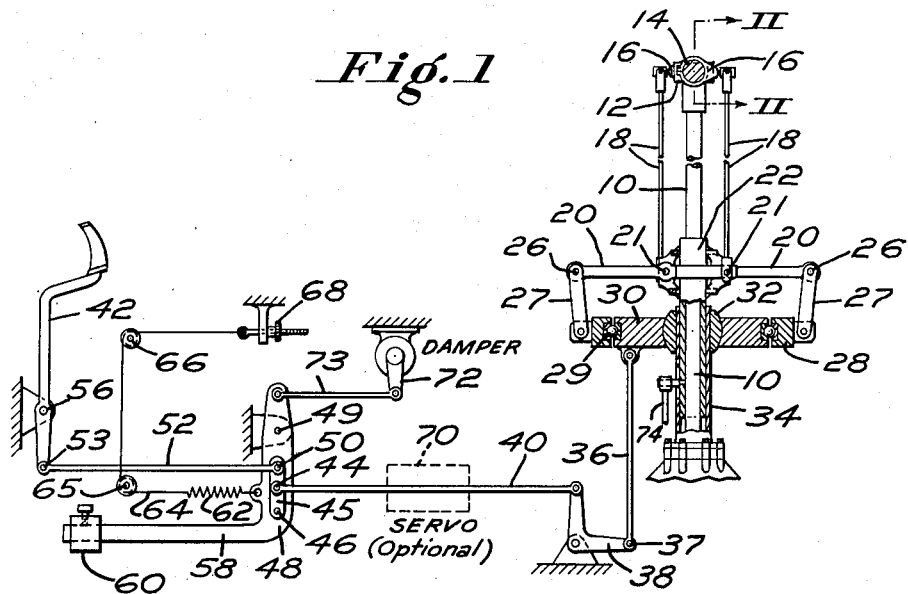
Fig. 1 is a fragmentary schematic illustration of one exemplification of the present invention in a single rotor type helicopter aircraft.
Figure 2:
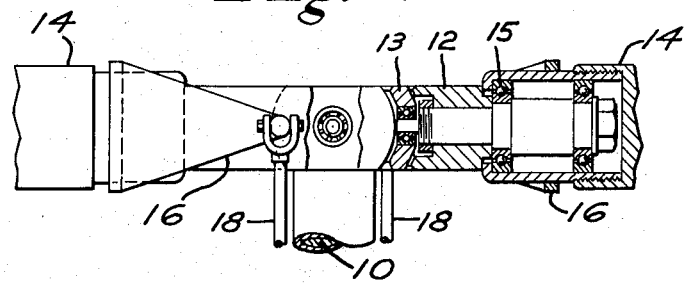
Fig. 2 is a fragmentary section, on an enlarged scale, taken along line II—II of Fig. 1.

Thus, whereas it is contemplated that the automatic control arrangement of the present invention is applicable with equal facility to all current type helicopter or other rotary type aircraft and the like, for purposes of illustration herein the invention is shown for example in Fig. 1 as being employed in conjunction with a single rotor type helicopter having a rotor mast or drive shaft as indicated at 10 which mounts a rotor hub as indicated at 12 which in turn carries a pair of diametrically opposed rotor blades extending radially therefrom as indicated at 14 (Fig. 2). The rotor hub 12 is mounted upon the drive shaft or mast 10 for universal inclination thereon by means of any suitable device such as a gimbal ring 13 as shown in U. S. Patent 2,368,698, or the like; while being at the same time pinned to the shaft 10 so as to rotate therewith in response to power applied to the drive shaft through means of the aircraft engine (not shown).

The rotor blades 14—14 are connected to the hub 12 by means of bearing devices 15 permitting the blades to be rotatable relative to the hub 12 about the long axes of the blades for blade pitch change purposes. A pitch control horn 16 extends from each of the blades into pivotal connection with a link device as indicated at 18, which in turn connects in each case to one end of a corresponding rocker arm 20. The rocker arms 20—20 are pivotally mounted as indicated at 21 upon the upper end of a sleeve 22 which has a vertical spline connection with the mast 10 and therefore rotates therewith while being vertically slidable thereon. As shown, the opposite end of each of the rocker arms 20 is pivotally connected as indicated at 26, for cyclic pitch control of the blades and hence longitudinal and lateral control of the aircraft, to a link 27 extending from the outer race portion of a swash plate device 28 which includes bearings 29 and an inner race 30.

The inner race 30 is in the form of a ring which is centrally bored to parti-spherical form so as to complement a parti-spherically shaped bearing portion 32 carried by the upper end of a sleeve portion 34 extending from rigid connection with the fixed aircraft structure and encircling the drive shaft and sleeve unit 10—22. A push-pull member as indicated at 36 connects to the inner race 30 of the swash plate device and extends downwardly into the aircraft body and then into pivotal connection as indicated at 37 to one end of a bell crank 38 which is fulcrumed upon the fixed aircraft structure and which pivotally connects at its other end to a push-pull member 40. Whereas, the swash plate type device has been shown and described as being mounted on the mast 10 by means of a ball and socket type bearing, it will be understood that any other suitable mounting device may be employed, such as for example, a Cardan joint device or the like.

Whereas, the other end of the push-pull member 40 might be connected to the pilot control stick as indicated at 42 for longitudinal pitch control of the aircraft with the inertia device of the invention connected thereto in any suitable manner, in the case of the present illustration the member 40 pivotally connects as indicated at 44 to a differential mechanism including a mixing lever 45 which is in turn pivotally mounted as indicated at 46 upon a crank arm 48. The crank arm 48 is in turn fulcrumed upon the fixed aircraft structure as indicated at 49 while the other end of the mixing lever 45 is pivotally connected as indicated at 50 to a push-pull member 52, the other end of which pivotally connects as indicated at 53 to the pilot control lever 42 which may be fulcrumed upon the fixed aircraft structure as indicated at 56.

The crank arm 48 includes a horizontal arm portion 58 upon which is hung a weight 60 at a position which is both ahead of the overall center of gravity of the aircraft and out of vertical alignment with the pivotal mounting 49 of the crank arm 48 on the aircraft frame. Thus, as shown in the drawing the weight 60 tends to bias the crank arm to rotate in counterclockwise direction as viewed in Fig. 1 about the pivotal connection 49; but a counterbalancing spring device as indicated at 62 is also provided in connection to the crank arm 48 to normally hold the crank and weight unit as in the position shown. A tension adjustment cable 64 is preferably arranged to run from the spring, as around pulleys 65—66, and then into an adjustment screw device as indicated at 68 so that the pilot may readily adjust the screw 68 to in turn vary the pull of the spring 62 upon the crank arm 48, thus adjusting the counter-balancing effect of the spring against the weight member 60. This system also operates to tend to "center" the pilot control stick and improves the "feel" of the control system, as is known in the art to be desirable. Another linkage arrangement (not shown)

may of course be also provided to be responsive to lateral movements of the pilot control stick 42 and so coupled to the swash plate unit 28 as to tilt it laterally for corresponding lateral maneuvering control of the aircraft, as is also well known in the art. As indicated at 70, a servo device may be included in conjunction with the push-pull member 40, if desired, to boost the forces of the pilot controlled system.

It will be noted that the differential mechanism interconnects the weight 60 and the pilot control stick 42 through its independently operable input elements 48 and 45, respectively, and differentially connects them to the single output element 40 leading to the rotor blade pitch control mechanism; the output magnitude being a function of the algebraic sum of the respective input magnitudes.

Thus, it will be appreciated that with the weight 60 and the spring 62 so selected and relatively adjusted as to normally balance the control linkage system in an attitude such as is illustrated in Fig. 1, any pilot actuations of the pilot control stick 42 will thereupon cause the mixing lever 45 to be oscillated upon its pivot connection 46. Such movement of the control arm will be in turn transmitted through the member 40 and the crank 38 to the push rod 36 thereby causing the swash plate unit 28 to be correspondingly tilted on its bearing 32 relative to the fixed structure of the aircraft. In turn, such tilting of the swash plate will cause the appropriate rocker arm 20 to be rocked upon its pivotal mounting on the sleeve 22, whereby the corresponding push-rod 18 will actuate the corresponding rotor blade pitch control horn for causing the rotor blades to rotate in their pitch change bearings cyclically as the rotor revolves about the vertical center line of the drive shaft 10. The rotor will be thereby controlled to provide varying effective angles of incidence of the respective blades as they revolve cyclically about the rotor mast.

Thus, it will be appreciated that inclusion of the mechanism of the present invention in conjunction with the conventional control system will not interfere with pilot operation of the latter for aircraft maneuvering purposes; while at all times, without attention by the pilot, the weight 60 is automatically attentive to any vertical accelerations of the aircraft and will operate automatically to adjust the rotor blade cyclic pitch control system to counter the acceleration movements of the aircraft. For example, assuming that the aircraft is flying forwardly in a substantially horizontal flight path, and that it is suddenly disturbed by a gust or the like and pitches upwardly, the weight 60 will lag behind the vertical "jump" of the aircraft due to the inertia of the weight. This lagging behind of the weight will automatically cause the lever 48 to rotate in counterclockwise direction about the pivot 49 thereby transmitting through the rod 40 a control motion tending to tilt the swash plate 38, due to the fact that the pilot control stick tends to remain fixed in its previous attitude relative to the aircraft frame. For this purpose the pilot control stick is preferably provided with a small amount of friction and/or adjustable centering springs (not shown) as is well known in the art. The control system is so designed and constructed that such a control motion imparted to the swash plate control system will tilt the latter in such manner as to cause the rotor blade cyclic pitch change devices to operate to cause the rotor to pitch downwardly, thereby offsetting or countering the rising motion of the aircraft. Similarly, any disturbances causing downward pitching of the aircraft will be automatically accompanied by upward or clockwise pivoting of the crank arm 48, resulting in corresponding adjustments of the blade pitch control swash plate so as to counter the oscillating tendencies so induced.

It will be appreciated that the spring 62 and the weight 60 of Fig. 1 will be preselected so as to be of such characteristics as to give relatively sensitive reaction to any vertical acceleration tendencies. Preferably, the action of the acceleration-responsive weight mass 60 will be damped, as for example by means of a suitable friction damping device as indicated at 72 through connection as indicated at 73 with crank arm 48. For "collective" control of the pitch of the blades of the rotor a control arm as indicated at 74 is coupled to the sleeve 22 through a suitably slotted portion of the collar 34.

It is of course essential that this acceleration countering control effect be so timed as to act in the manner of a damping influence against the phugoid oscillating influence which is normally set up by the disturbing gust or the like as distinguished from being cumulative thereto.

Figure 3:
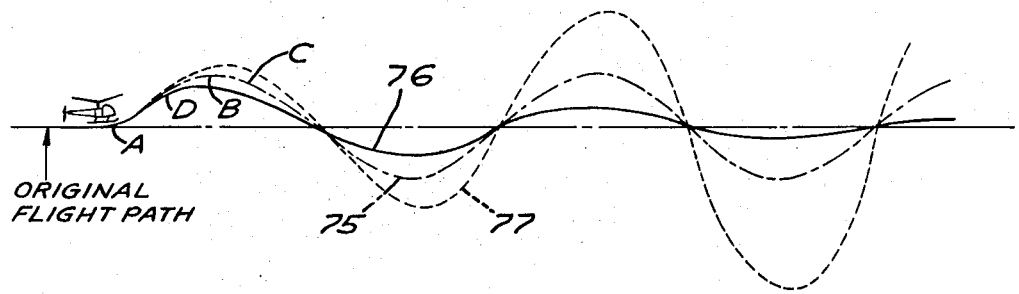
Fig. 3 is a graphical illustration of three different types of helicopter flight paths, which will be referred to hereinafter for the purpose of explaining the need for and the effect of the present invention.

Fig. 3 illustrates graphically the effect of the present invention. In this illustration, the curve designated 75 illustrates the deviations from a flight path which a conventional helicopter aircraft or the like may take in response to a flight path disturbing gust, if the aircraft is of neutral stability characteristics. Thus, as shown in Fig. 3 whenever the aircraft is disturbed by an oncoming gust or the like as at point A on curve 75, the rotor is thereby tilted upwardly and is accompanied by the fuselage in assuming an upwardly pitched attitude. The flight path then curves upwardly and crests as indicated at B and then starts to decline as indicated at C, and thereupon continues to oscillate with substantially constant velocity and amplitudes above and below the horizon of the original straight line flight path. On the other hand, as illustrated by curve 76, whenever a helicopter aircraft embodying the present invention is met by an oncoming gust and pitches upwardly, the acceleration-responsive control device of the present invention then goes into operation automatically such as at the position indicated at D on the curve 76 whereby to anticipate and repulse the forces normally producing phugoidal oscillation of the flight path.

The essential feature of the operation of the device lies in the timing of its action, which is such as to anticipate the motions of the helicopter. For example, if the weight 60 were to be located at the center of gravity of the machine, maximum effect would be produced at or slightly past the point B of curve 75. If the weight 60 is located forwardly of the aircraft center of gravity, then the fuselage pitching accelerations will also affect it, causing its maximum effect to occur slightly before point B, such as at D of curve 75. This phase relationship is essential to proper operation of the device. Thus, the control mechanism of the present invention suppresses the tendency of the aircraft to oscillate in its flight path as shown by curve 75, and operates to damp the tendencies to oscillation both above and below the plane of the original horizontal flight path so as to ultimately result in leveling out of the flight path as indicated at the right hand end portion of the curve 76.

The present invention is clearly distinguished from the operation of conventional type helicopter aircraft such as are inherently instable, and which therefore tend to fly in increasingly divergently oscillating flight paths as indicated for example by curve 77 of Fig. 3. This curve illustrates how the oscillations of inherently unstable helicopter aircraft tend to constantly increase in velocity and amplitude, and therefore require strict and expert counter control by the aircraft pilot in order to avoid disaster in the absence of a device of the present invention. It is to be understood that while the embodiment illustrated by the drawing herein involves location of the acceleration device forward of the center of gravity of the aircraft, thus causing maximum response before the aircraft reaches point B, Fig. 3; it is possible that the device could be advantageously located at or even aft of the center of gravity, depending on the natural flight characteristics of the aircraft involved.

Fig. 4 illustrates application of the invention to a tandem rotor type helicopter aircraft wherein the rotor system of the aircraft is illustrated to comprise fore and aft masts 80—82 respectively, each carrying rotors as indicated generally at 84—86 in the manner of the rotor arrangement of Fig. 1. The blades of the rotors are pitch-adjustable by means of push-pull rods 87—88 connected to levers 90—92 which are fulcrumed upon vertically shiftable sleeves 94—96 and controllable by links 97—98. The links 97—98 extend from the outer races 99—100 of swash plate devices 102—104 which are mounted for universal inclination relative to the masts, as by means of spherical bearing devices 106—108 carried by sleeves 109—110 encircling the corresponding rotor drive shafts 80—82.

The swash plates 102—104 are in turn controlled as to their inclinations relative to the masts 80—82 by means of push-pull rods 112—114 which connect through means of bell cranks 116—118 to a common push-pull rod 120. The rod 120 pivotally connects as indicated at 122 to the central portion of a mixing lever 124 which is fulcrumed as indicated at 126 upon a crank arm 128 which is in turn fulcrumed upon the fixed aircraft structure as indicated at 129. The free end of the mixing lever 124 is pivotally connected to a push-pull member 130 which in turn pivotally connects as indicated at 131, for longitudinal pitch control of the craft, to a cyclic pitch control pilot lever 132 which is fulcrumed to the aircraft structure as indicated at 133. The crank 128 is provided with a laterally extending arm portion 134 which carries thereon a weight mass as indicated at 135; and a tension spring 138 is connected to the arm portion 134 and to the fixed aircraft structure so as to counter-balance the weight of the mass 135 so as to normally maintain the crank arm 128 in the attitude substantially as shown in Fig. 4. A damper as indicated at 139 is preferably coupled to the crank arm 128 to damp the movement thereof as explained in connection with the damper installation 72 of Fig. 1.

In this tandem rotor arrangement provision for control of the rotor blade pitch system collectively is illustrated as comprising a pilot control lever 140 which is fulcrumed upon the fixed aircraft structure as indicated at 141 and connected to a push-pull member 142 which interconnects a pair of bell cranks 144 which in turn actuate push-pull members 146—148 leading into pivotal connections as indicated at 149—150 with levers 151—152. These levers are fulcrumed as indicated at 153—154 upon links 155—156 which in turn connect respectively to bell cranks 157—158 arranged to be actuated by a push-pull member 160 which in turn is actuated by a lever 162 fulcrumed upon the aircraft frame intermediately of its ends and pivotally connected as indicated at 164 to the push-pull member 120 previously referred to.

However, it is to be noted that the bell crank and push-pull members 157, 158, 160 are interconnected so as to provide a "differential" type operation of the bell cranks 157—158 responsive to movement of the push-pull member 160, whereby the bell crank members are driven to pivot simultaneously but in opposite directions by movement of the push-pull member 160. Thus, for example, movement of the push-pull member 160 from left to right as shown in Fig. 4, will cause the bell crank 157 to rotate in counterclockwise direction while the bell crank 158 is simultaneously caused to rotate in clockwise direction. Reversely, movement of push-pull member 160 from right to left as viewed in Fig. 4 will cause the bell crank 157 to rotate in clockwise direction while the bell crank 158 is caused to rotate in counterclockwise direction.

The free end of the rocking lever 151 is pivotally connected as indicated at 166 to a push-pull member 168 which pivotally connects as indicated at 169 to a pin device extending integrally from the vertically reciprocable sleeve 94; the pin connection device 169 being extended through a vertically slotted portion of the outer sleeve structure 109. Similarly, the rocker beam 152 is pivotally connected as indicated at 172 to a push-pull member 174 which in turn pivotally connects as indicated at 176 to a pin device extending integrally from the inner vertically reciprocable sleeve 96 through means of a vertically slotted portion of the outer sleeve 110.

Thus, it will be appreciated that when the collective pitch control lever 140 is pulled up and rearwardly, for example, the push-pull member 142 will be moved from right to left as viewed in Fig. 4, thereby pulling the bell cranks 144—144 to rotate in clockwise direction with consequent raising of the collective pitch control sleeve 94—96 by virtue of the linkage connections thereto referred to hereinabove; the pivot points 153—154 functioning thereupon as fulcrum points for the levers 151—152. Hence, pilot-operation of the lever 140 will procure simultaneous pitch change adjustments of the effective angles of incidence of the rotor blades of both rotor units for hovering and vertical ascent-descent control of the aircraft; the collective pitch adjustments of the rotor blades of the respective rotor units being, under such circumstances, substantially equal in degree and in the same direction.

However, due to the linkage system comprising the beam 162 which pivotally connects to the push-pull member 120 and then to the bell cranks 157, 158 and then into the "differential" collective pitch control mechanism whenever a cyclic pitch control effect is established as for example by pilot-manipulation of the control lever 132, the collective rotor blade pitch control devices of the respective rotor units are simultaneously affected "differentially." The arrangement is such that whenever the pilot presses forwardly on the control lever 132 for cyclic control of the rotor units in order to obtain a forward traveling component in the lift force system, the rotor blade collective pitch control system is thereby simultaneously adjusted in such manner as to slightly decrease the pitch adjustments of all of the blades of the forward rotor unit while simultaneously increasing the pitch adjustments of all of the blades of the aft rotor unit. This immediately establishes a forward and downward pitching couple force acting on the aircraft tending to lower the nose and to raise the tail of the aircraft.

Then, upon pilot-adjustment of the cyclic control stick 132 rearwardly, as for the purpose of terminating the forward flight progress, the blades of the rotor units are thereby cyclically adjusted as to pitch so as to bring both rotors back to horizontal attitudes for simple hovering flight of the aircraft. Simultaneously therewith the "differential" control mechanism will operate to adjust the collective pitch control devices of the rotor units so as to equalize the collective pitch adjustments of the blades of the respective rotor units, so that the craft returns to a level attitude for hovering flight.

Similarly, any automatic adjustments of the rotor control mechanism such as may be introduced during flight by virtue of operation of the device of the present invention, as in response to acceleration-induced motions of the mass weight 135 relative to the airframe, will be introduced into both the cyclic and collective pitch change control mechanism described hereinabove for simultaneous coordinated adjustments of the cyclic and collective pitch control mechanisms of the fore and aft rotor units.

In lieu of the combination cyclic and collective pitch control system hereinabove described in connection with tandem rotor type helicopters it is contemplated that the acceleration-responsive device of the invention may be employed in a tandem rotor type helicopter in control of only the collective pitch control of either one of the rotors. For example, the device may be connected solely to the collective pitch control system of the forward rotor; and in such case whenever the aircraft pitches upwardly the acceleration-responsive device operates automatically to reduce the pitch of the blades of the front rotor, thus counteracting the pitching motion. Or, it may be connected to the collective pitch control system of the rear rotor to increase the pitch of the rear rotor when the ship pitches upwardly to counter the "porpoising" tendency of the craft.

Whereas, the invention has been illustrated and described only in conjunction with a "Young" type rotor mechanism as disclosed for example in U. S. Patent 2,368,698; it is to be understood that the invention is applicable with equal facility to any other type helicopter rotor or rotary wing system. For example, the invention is equally applicable to helicopter aircraft wherein the rotor hub is rigidly attached to the rotor mast or drive shaft, and wherein the rotor blades are individually articulated to the rotor hub by means of hinge devices permitting flapping of the blades relative to the hub. In any case the rotor blades will be individually pitch-adjustable relative to the hub structure and arranged as explained hereinabove for cyclic as well as collective pitch control, and coupled to both the conventional pilot controls and to the vertical motion acceleration-responsive mechanism of the present invention as explained hereinabove. Thus, any tendencies of the aircraft to pitch away from the intended flight path will be automatically and instantaneously anticipated and countered by automatic operation of the acceleration responsive control mechanism of the invention.

It will be appreciated that the weight mass as illustrated at 60 (Fig. 1) and at 135 (Fig. 4) may take any convenient form, and may comprise an otherwise useful weight as for example the aircraft storage battery or the like if preferred. Also, it will be appreciated that the weight mass may be connected to the cyclic and differential collective pitch control systems in any other desired manner, such as for example by fixing it directly upon the pilot control lever provided of course it is out of vertical alignment with the mounting lever pivot, so as to be responsive to vertical accelerations of the aircraft. It is also to be understood that whereas in Fig. 1 of the drawing, the acceleration-responsive weight device is shown as being connected only into the cyclic control system; it may in like manner be connected only into the collective control system leading to the member 74 of Fig. 1, or in combination therewith and with the cyclic control system.

Hence, it will be understood that although only a few forms of the invention have been illustrated and described hereinabove it will be apparent to those skilled in the art that the invention is not so limited but that various changes may be made therein without departing from the spirit of the invention or the scope of the appended claims.

What is claimed is:

1. In a helicopter aircraft or the like, the combination comprising a bladed lift rotor mounted upon the aircraft, a pitch change mechanism for said rotor, a pitch control system operatively connected to said pitch change mechanism for adjustment thereof, pilot-operable control means, inertia means mounted on said aircraft for movement relative thereto in response to acceleration of said aircraft in either vertical direction, and means including a differential mechanism operatively connecting both said pilot-operable control means and said inertia means to said pitch control system for actuation thereof, said differential mechanism having a pair of independently operable input control elements and an output control element in which the output magnitude is a function of the algebraic sum of the respective input magnitudes, said pilot-operable control means being connected to operate one of said input control elements, said inertia means being connected to operate the other of said input control elements, and said output control element being connected to operate said pitch control system.

2. The combination set forth in claim 1, together with damping means operatively connected to said inertia means to damp the action thereof.

3. The combination set forth in claim 1, wherein said inertia means is positioned ahead of the center of gravity of the aircraft.

4. In a helicopter aircraft or the like, the combination comprising a bladed lift rotor mounted upon the aircraft, a cyclic pitch change mechanism for said rotor, a cyclic pitch control system operatively connected to said cyclic pitch change mechanism for adjustment thereof, pilot-operable control means, inertia means mounted on said aircraft for movement relative thereto in response to acceleration of said aircraft in either vertical direction, and means including a differential mechanism operatively connecting both said pilot-operable control means and said inertia means to said cyclic pitch control system for actuation thereof, said differential mechanism having a pair of independently operable input control elements and an output control element in which the output magnitude is a function of the algebraic sum of the respective input magnitudes, said pilot-operable control means being connected to operate one of said input control elements, said inertia means being connected to operate the other of said input control elements, and said output control element being connected to operate said pitch control system.

5. In a helicopter aircraft or the like, the combination comprising a bladed lift rotor mounted upon the aircraft, a collective pitch change mechanism for said rotor, a collective pitch control system operatively connected to said pitch change mechanism for adjustment thereof, pilot-operable control means, inertia means mounted on said aircraft for movement relative thereto in response to acceleration of said aircraft in either vertical direction, and means including a differential mechanism operatively connecting both said pilot-operable control means and said inertia means to said collective pitch control system for actuation thereof, said differential mechanism having a pair of independently operable input control elements and an output control element in which the output magnitude is a function of the algebraic sum of the respective input magnitudes, said pilot-operable control means being connected to operate one of said input control elements, said inertia means being connected to operate the other of said input control elements, and said output control element being connected to operate said pitch control system.

6. In a helicopter aircraft or the like, the combination comprising a plurality of bladed lift rotors mounted upon the aircraft, pitch change mechanisms for said rotors, a pitch control system operatively connected to said pitch change mechanisms for adjustments thereof, pilot-operable control means, inertia means mounted on said aircraft for movement relative thereto in response to acceleration of said aircraft in either vertical direction, and means including a differential mechanism operatively connecting both said pilot-operable control means and said inertia means to said pitch control system for like actuation of said pitch mechanisms, said differential mechanism having a pair of independently operable input control elements and an output control element in which the output magnitude is a function of the algebraic sum of the respective input magnitudes, said pilot-operable control means being connected to operate one of said input control elements, said inertia means being connected to operate the other of said input control elements, and said output control element being connected to operate said pitch control system.

7. In a helicopter aircraft or the like, the combination comprising a plurality of bladed lift rotors mounted upon the aircraft, a pitch change mechanism for each of said rotors, a pitch control system operatively connected to said pitch change mechanisms for adjustments thereof, pilot-operable control means, inertia means mounted on said aircraft for movement relative thereto in response to acceleration of said aircraft in either vertical direction, and means including a differential mechanism operatively connecting both said pilot-operable control means and said inertia means to said pitch control system for different actuation of said pitch change mechanisms, said differential mechanism having a pair of independently operable input control elements and an output control element in which the output magnitude is a function of the algebraic sum of the respective input magnitudes, said pilot-operable control means being connected to operate one of said input control elements, said inertia means being connected to operate the other of said input control elements, and said output control element being connected to operate said pitch control system.

8. In a helicopter aircraft or the like, the combination comprising a plurality of bladed lift rotors mounted upon the aircraft, cyclic and collective pitch change mechanisms for each of said rotors, a collective pitch control system operatively connected to said collective pitch change mechanisms for adjustments thereof, a cyclic pitch control system operatively connected to said cyclic pitch change mechanisms for adjustments thereof, pilot-operable control means, inertia means mounted on said aircraft for movement relative thereto in response to acceleration of said aircraft in either vertical direction, and means including a differential mechanism operatively connecting both said pilot-operable control means and said inertia means to said pitch control systems for actuation thereof, said differential mechanism having a pair of independently operable input control elements and an output control element in which the output magnitude is a function of the algebraic sum of the respective input magnitudes, said pilot-operable control means being connected to operate one of said input control elements, said inertia means being connected to operated the other of said input control elements, and said output control element being connected simultaneously operate both of said pitch control systems.

9. The combination set forth in claim 8, wherein said cyclic pitch control system provides like adjustments of said cyclic pitch change mechanisms, and said collective pitch control system provides oppositely directed adjustments of said collective pitch change mechanisms.

10. In a helicopter aircraft or the like, the combination comprising a bladed lift rotor mounted upon the aircraft, cyclic and collective pitch change mechanisms for said rotor, a pitch control system operatively connected to said pitch change mechanisms for adjustments thereof, pilot-operable control means, inertia means mounted on said aircraft for movement relative thereto in response to acceleration of said aircraft in either vertical direction, and means including a differential mechanism operatively connecting both said pilot-operable control means and said inertia means to said pitch control system for actuation thereof, said differential mechanism having a pair of independently operable input control elements and an output control element in which the output magnitude is a function of the algebraic sum of the respective input magnitudes, said pilot-operable control means being connected to operate one of said input control elements, said inertia means being connected to operate the other of said input control elements, and said output control element being connected to operate said pitch control system.

References Cited in the file of this patent

UNITED STATES PATENTS

| | | |
|---|---|---|
| 2,092,424 | Potez | Sept. 7, 1937 |
| 2,432,348 | Stalker | Dec. 9, 1947 |
| 2,555,577 | Daland | June 5, 1951 |
| 2,629,452 | Alex | Feb. 24, 1953 |

FOREIGN PATENTS

| | | |
|---|---|---|
| 706,796 | France | Mar. 31, 1931 |
| 838,413 | France | Dec. 7, 1938 |
| 880,122 | France | Dec. 18, 1942 |